Jan. 8, 1963
M. J. SCHLITTERS
3,071,997
SELF-ADJUSTING TOOL HOLDERS
Filed May 12, 1960
2 Sheets-Sheet 1
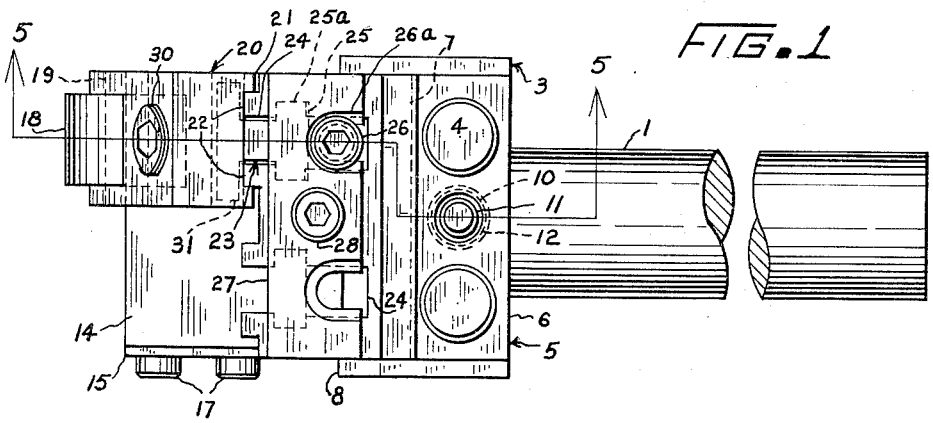
FIG. 1
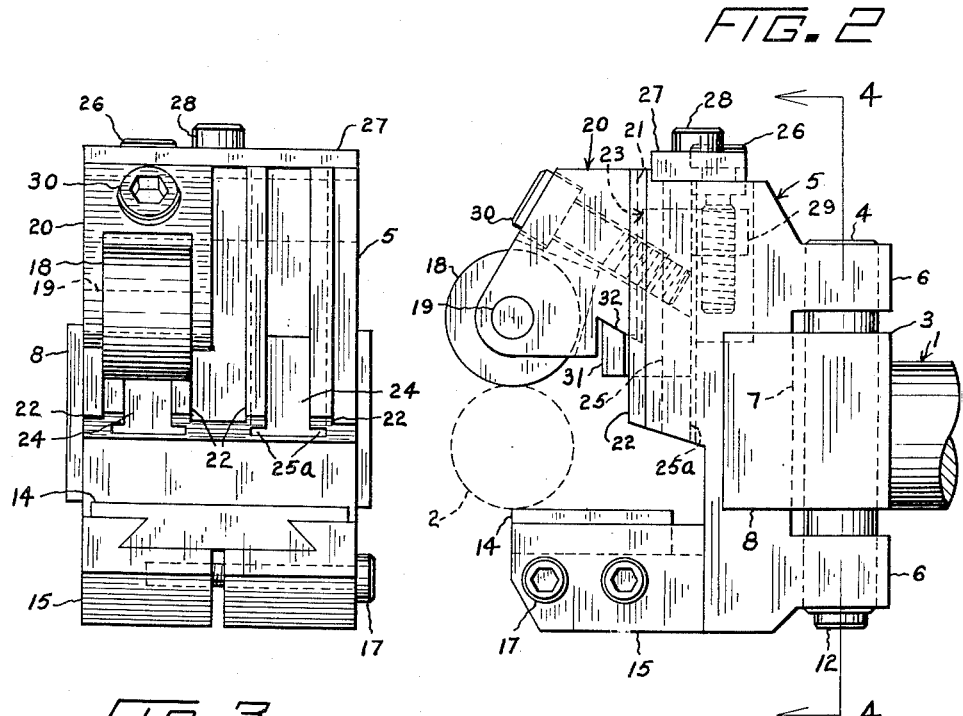
FIG. 3
FIG. 2
INVENTOR
MICHAEL J. SCHLITTERS, DECEASED
BY HAGOP S. DERDERIAN AND
ESTHER M. SCHLITTERS, CO-EXECUTORS
BY
*J.D. Murray*
ATTORNEY Jan. 8, 1963　　　M. J. SCHLITTERS　　　3,071,997
SELF-ADJUSTING TOOL HOLDERS
Filed May 12, 1960　　　　　　　　　　　　　　　　　2 Sheets-Sheet 2

INVENTOR
MICHAEL J. SCHLITTERS, DECEASED
BY HAGOP S. DERDERIAN AND
ESTHER M. SCHLITTERS, CO-EXECUTORS
BY J. S. Murray
ATTORNEY

3,071,997
SELF-ADJUSTING TOOL HOLDERS
Michael J. Schlitters, deceased, late of Grosse Pointe, Mich.; by Hagop S. Derderian, 810 Ford Bldg., Detroit, Mich., and Esther M. Schlitters, 1357 Yorkshire, Grosse Pointe, Mich., co-executors
Filed May 12, 1960, Ser. No. 28,653
4 Claims. (Cl. 82—35)

This invention relates to self-adjusting tool holders and particularly such holders as applied to automatic screw machines. The invention may be regarded as an improvement on the disclosure of Patent 2,364,320, issued December 5, 1944. Said patent discloses a tool holder rigidly mounting a cutter for taking effect on a rod rotated by a screw machine, said holder further mounting a guide roller spaced from the cutter and adapted to ride upon the rotating rod as the tool holder is advanced to its effective position, the holder being thus adjusted transversely to its direction of advance to provide for a shaving or other required tooling of the rod by the cutter.

An object of the invention is to provide an improved mechanism for adjusting a carriage for the guide roller to or from the cutter and for locking such carriage in selective positions of such adjustment, whereby any such adjustment may be more rigidly maintained than heretofore.

Another object is to provide an adjusting screw for shifting said guide roller to and from the cutter and a locking screw for maintaining a desired adjustment, said screws both engaging a nut having a face for clamping coaction with a carriage for the roller and additional faces for clamping coaction with the tool holder, both such coactions being responsive to the locking screw.

Another object is to adapt the roller carriage to be adjusted by a screw rotatively carried by the tool holder, and to provide on said carriage a screw for locking the carriage in selective positions of adjustment, both said screws being engaged by a nut slidable in the holder and having a clamping coaction with both the holder and carriage.

These and various other objects are attained by the construction hereinafter described and illustrated in the accompanying drawings, wherein:

FIG. 1 is a top plan view of the improved tool.

FIG. 2 is a side elevational view showing the cutter operating on a workpiece.

FIG. 3 is a front view of the tool.

Figure 4:
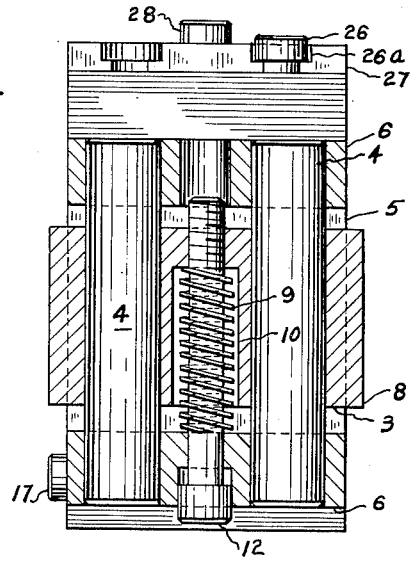
FIG. 4 is a vertical cross section taken on the line 4—4 of FIG. 2.
Figure 5:
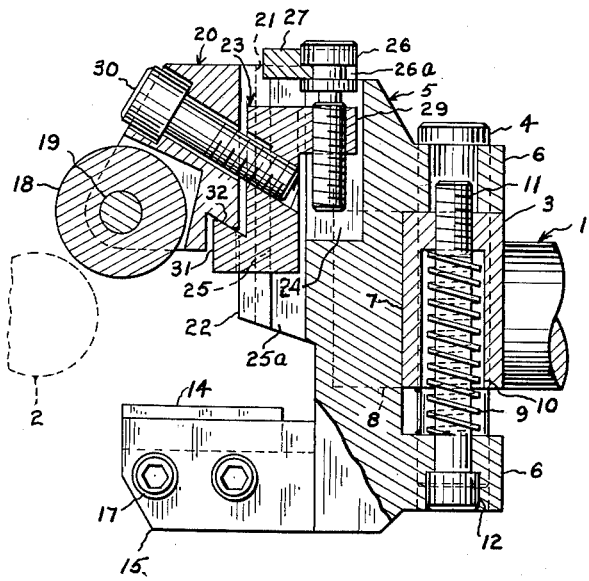
FIG. 5 is a fragmentary section taken on the line 5—5 of FIG. 1, and particularly showing a work-engaging guide roller, as positioned just prior to its engagement with a workpiece.

In these views, the reference character 1 designates the usual tool holder shank suited to be held in the socket of a screw machine slide (not shown) for advancing and retracting the holder at proper time intervals to effect a required tooling of a workpiece 2. The latter is represented as a rod, several of which are carried and driven by the screw machine spindles (not shown), to be indexed at proper time intervals. The shank 1 at its front end integrally carries a rectangular head 3, wherein two spaced parallel pins 4 are press-fitted, or otherwise rigidly mounted, such pins being transverse to the shank and to the axis of rotation of the work. The end portions of said pins project from the head 3 to serve as slide guides for a tool holder 5 by engaging upper and lower lugs 6 projecting integrally and rearwardly from said holder. To further assure accurate guidance of the holder on the head 3, these parts have extensive engaging faces 7 transverse to the shank, and the head 3 is laterally formed with a pair of forwardly projecting flanges 8 lapping the sides of the holder.

Between the pins 4 a coiled spring 9, having its major portion socketed at 10 in the head 3, reacts between said head and the lower lug 6 to yieldably resist upward sliding of the tool holder. Response of the tool holder to said spring is regulated by an adjusting screw 11 which extends rotatively through the lower lug 6 and has a head 12 socketed in and affording a seat to said lug, such screw extending freely through the spring and being threaded in the head 3 above the socket 10.

A finishing or shaving cutter 14 is rigidly carried by a projection 15 forwardly extending from the lower end of the holder 5. Such projection comprises a pair of clamping jaws engaging opposite sides of the cutter, and subjected to clamping stress by screws 17. Upwardly spaced from the cutter is a guide roller 18 journaled on a shaft 19 fixed in a carriage 20, adjustable to and from the cutter on the front upper portion of the holder 5. To guide the carriage in such adjustment, it is formed with a pair of spaced parallel rearwardly projecting ribs 21 which straddle a pair of similar ribs 22 forwardly projecting from the holder 5.

To accurately apply a desired up and down adjustment to the carriage, a nut 23 is slidable in a groove 24 opening in the front face of the holder 5 and elongated in the direction of said adjustment. The nut is formed with a pair of opposed ribs 25 slip fitted in grooves 25a in opposite walls of the groove 24, being thus accurately guided for an adjustment purpose. Also for such purpose, the nut is threadedly engaged by a screw 26 occupying the groove 24 and having its upper end headed and annularly grooved to accommodate the margin of a U-shaped opening 26a in a plate 27 receiving the screw head and restraining the screw from lengthwise travel. The plate 27 surmounts the holder 5 being rigidly secured to the latter by a headed screw 28. Preferably the nut has a lug 29 on its upper portion rearwardly projecting for threaded engagement by the screw 26.

For locking the carriage 20 in any adjustment thereof, a screw 30 is extended freely through the carriage and is screwed into the mid portion of the nut, and has a head set into the front face of the carriage. Thus when the screw 30 is tightened, the carriage and nut are stressed toward each other, whereby the ribs 25 are forwardly clamped against the front walls of the grooves 25a and the carriage clamps against the front face of the holder, being thus firmly held in any position of its adjustment relative to the cutter. In effecting any such adjustment, it is of course necessary to loosen the locking screw 30.

Preferably the screw 30 in extending rearward from its headed end converges toward the axis of the shank 1 at an acute angle, as for example 31 degrees so that the rearward stress applied to the carriage upon tightening of said screw has a downwardly acting component. Such component is utilized by forming the nut 23 with a forwardly projecting lug 31 which engages beneath the carriage, rearwardly of the roller 18. Such lug has an upper face engaging a bottom face of the carriage, such faces 32 having a divergency to the shank axis slightly less than that of the screw 30, as for example, 30 degrees. This has the effect of producing a material clamping reaction between said faces as the locking screw is tightened, thus adding to the clamping effect derived by the aforementioned rearward seating of the carriage on the holder 5. Also the lug 31 powerfully resists any tendency of carriage to shift slightly in a forward direction under stresses imposed on the roller. Such stresses would impose undue wear on the threads of the screw 30 in absence of the described lug.

The described adjustability of the roller and its carriage adapts the tool to operate on rods of different diameters and further serves to regulate the thickness of metal removed by the cutter.

The illustrated construction affords alternative side by side positions for the carriage on the holder 5 and accordingly the ribs 22, groove 24 and grooves 25a are provided on the holder at each side of its medial vertical plane, as is likewise true of openings 26a in the plate 27.

The cutter 14 exemplifies one type of tooling member which may be installed on the holder 5, it being understood that various other members may be employed according to the required tooling operation.

What is claimed is:

1. In a screw machine tool of the type comprising a holder for a tooling member, means for operatively mounting such member on the holder, a shank for advancing and retracting the holder to and from a workpiece, means for mounting the holder on the shank and affording the holder a floating travel transverse to the shank, a spring reacting between the holder and shank and urging the holder toward one limit of its floating travel, a carriage slidable on the holder to and from the tooling member, a guide roller spaced from the tooling member in the direction of sliding travel of the carriage, and means for journaling said roller on the carriage, the combination with said holder and carriage, of a feed nut slidable in the holder for applying said sliding travel to the carriage, an adjusting screw threadedly engaging the nut and rotatively carried by the holder for sliding the nut in the holder, and a locking screw rotative in said carriage and divergent to the adjusting screw and threaded in said nut for locking the carriage in a selective position of sliding travel of the carriage, the nut having a forward projection and the carriage having a downwardly opening recess receiving such projection, such projection and recess having interengaged faces resisting forward withdrawal of the carriage from the nut.

2. A screw machine tool as set forth in claim 1, said interengaged faces acutely diverging from the axis of the locking screw, whereby the carriage applies a downward pressure to said projection through said faces responsive to tightening of said locking screw.

3. A screw machine tool as set forth in claim 1, said interengaged faces having an acute divergency to the axis of said shank, and said locking screw converging slightly toward said interengaged faces, whereby the carriage applies a downward pressure to said projection through said faces, responsive to tightening of the locking screw.

4. A screw machine tool as set forth in claim 1, the holder having a forwardly opening groove wherein the feed nut is guided in its sliding travel, said locking screw extending rearwardly into said groove to interconnect the carriage and nut and to compel sliding travel of the carriage in substantial unison with the nut.

References Cited in the file of this patent

UNITED STATES PATENTS

| | | |
|---|---|---|
| 2,364,320 | Schlitters | Dec. 5, 1944 |
| 2,384,512 | Wiken et al. | Sept. 11, 1945 |
| 2,587,370 | Nelson | Feb. 26, 1952 |

FOREIGN PATENTS

| | | |
|---|---|---|
| 2,438 | Great Britain | Sept. 20, 1906 |